Jan. 24, 1967  A. D. COLVIN ETAL  3,299,703
ELECTROMAGNETIC FLOWMETER
Filed July 22, 1963  2 Sheets-Sheet 1
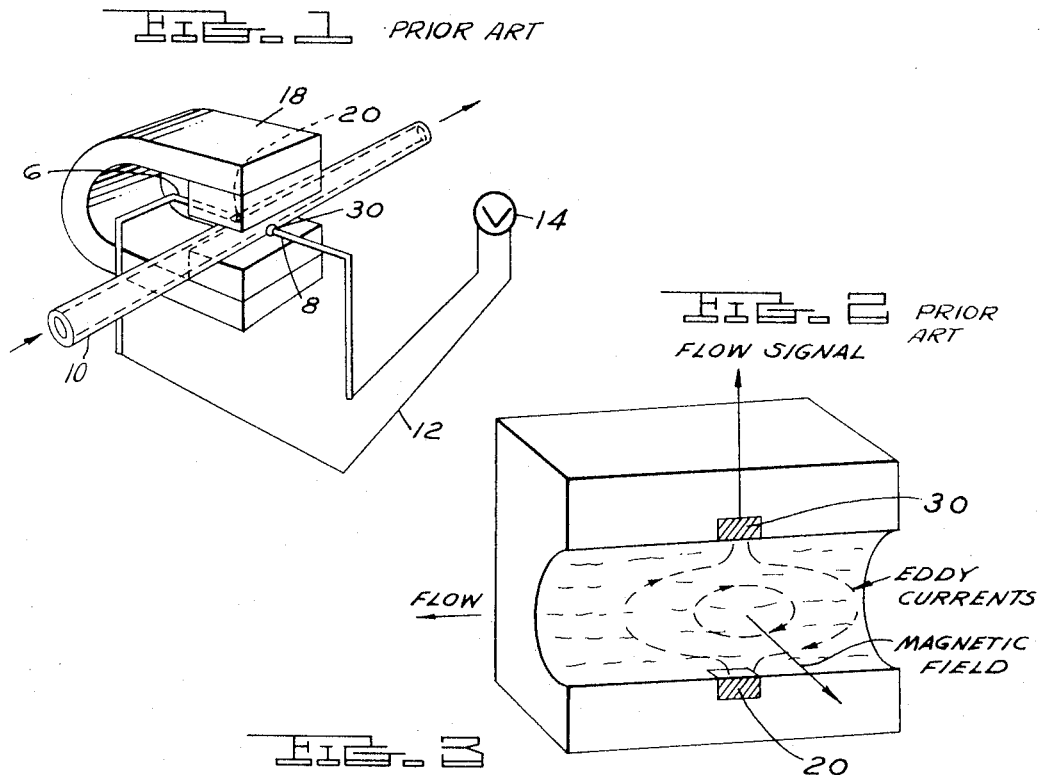
FIG. 1 PRIOR ART
FIG. 2 PRIOR ART
FIG. 3
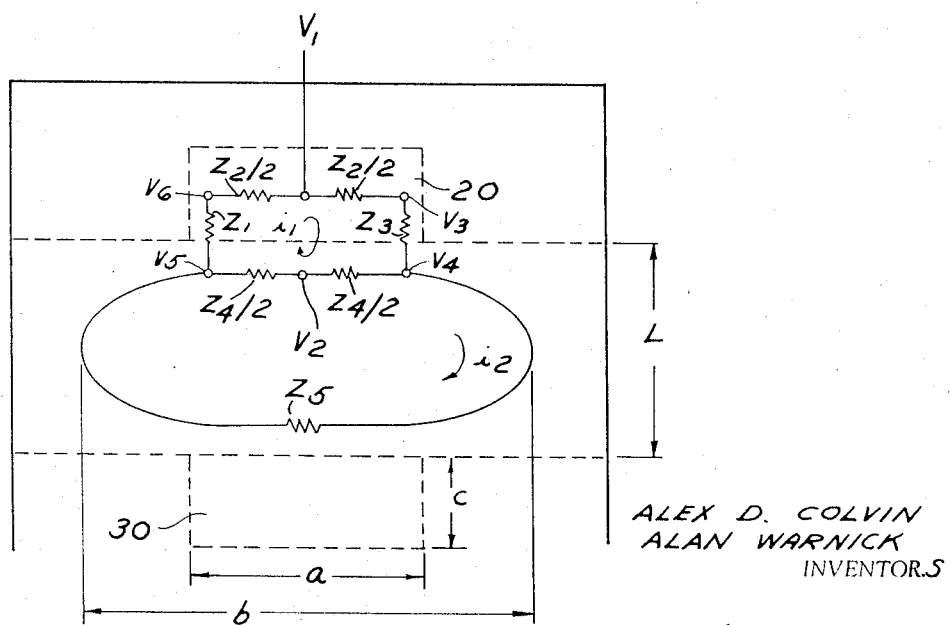
ALEX D. COLVIN
ALAN WARNICK
INVENTORS
BY John R. Faulkner
Stuart Lubitz
ATTORNEYS Jan. 24, 1967 A. D. COLVIN ET AL 3,299,703
ELECTROMAGNETIC FLOWMETER
Filed July 22, 1963 2 Sheets-Sheet 2
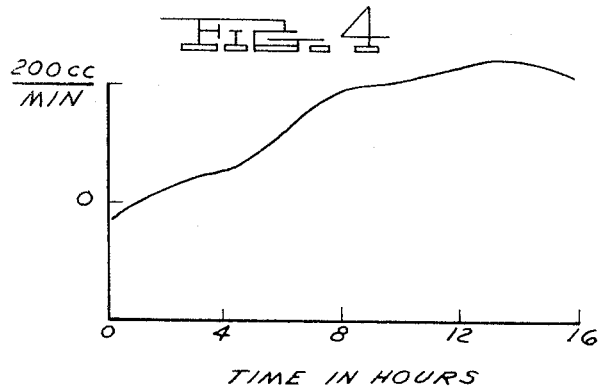
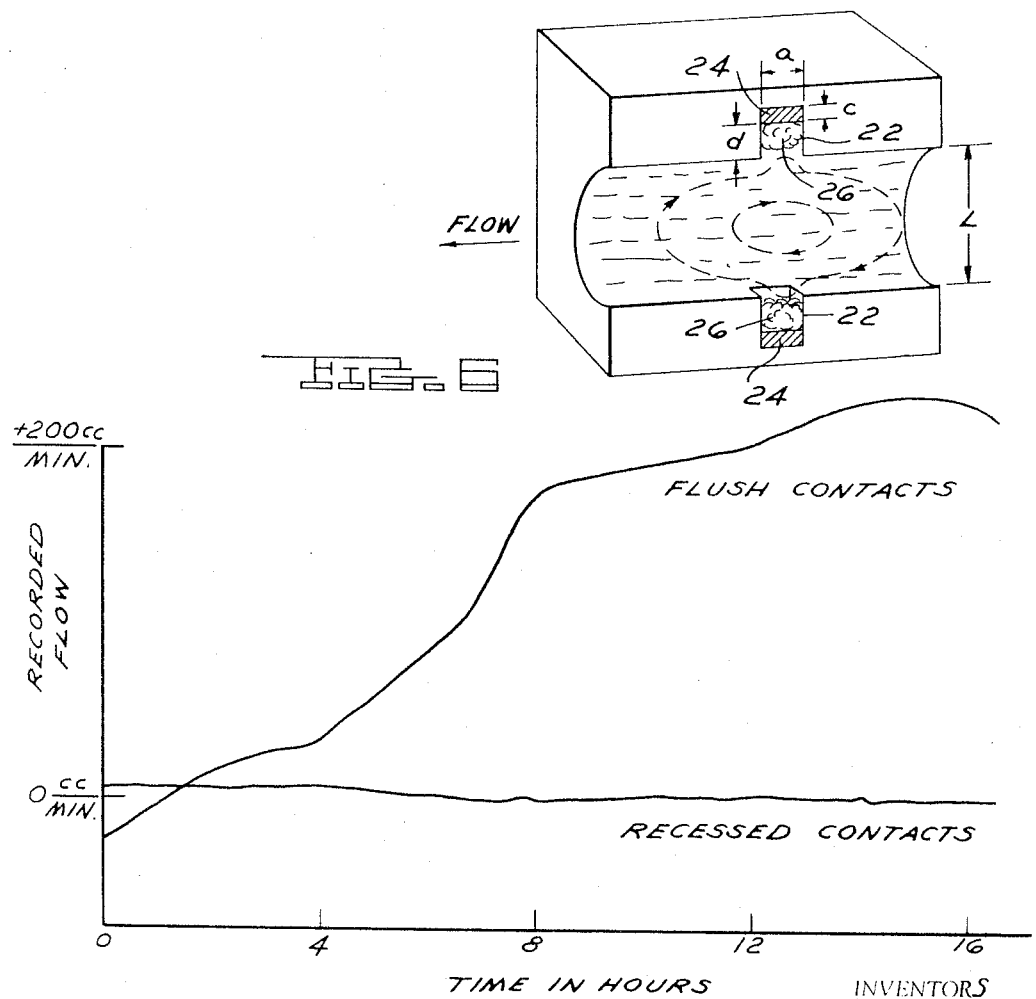
INVENTORS
ALEX D. COLVIN
ALAN WARNICK
BY
John R. Faulkner
Stuart Lubitz
ATTORNEYS United States Patent Office 3,299,703
Patented Jan. 24, 1967

3,299,703
ELECTROMAGNETIC FLOWMETER
Alex D. Colvin, Livonia, and Alan Warnick, Oak Park, Mich., assignors to Ford Motor Company, Dearborn, Mich., a corporation of Delaware
Filed July 22, 1963, Ser. No. 296,584
7 Claims. (Cl. 73—194)

This invention relates to a magnetic flowmeter and more particularly to an electromagnetic flowmeter wherein the zero drift has been substantially reduced.

Currently available electromagnetic flowmeters have been used to measure flow such as normal blood flow. These meters are subject, however, to sufficient zero drift to make readings at low flow rates unreliable. In order to remedy this zero drift, it has become a common practice, when possible, to establish a zero flow condition and compensate for any drift by a proper adjustment of the electronic circuitry. This technique of zero drift compensation assumes that the zero drift is constant and that a zero flow condition may be established. In many cases such zero drift compensation is not possible or desirable. For example, when flow measurements through diseased arteries are to be taken, the occluding of a blood vessel to establish a zero flow reference would be relatively dangerous. In order to avoid the necessity for such zero drift compensation, a flowmeter having little zero drift has been developed. This flowmeter is a result of the discovery of one source of zero drift and a way of counteracting it. The discovered source of zero drift error and the technique and construction to eliminate this error will be readily understood when the detailed written description and derivations are considered in conjunction with the drawings wherein:

FIGURE 1 is a schematic drawing of a typical electromagnetic flowmeter combination;

FIGURE 2 is a diagram of the eddy current pattern in a conduit having the contacts of the electromagnetic flow transducer mounted flush with its inside diameter;

FIGURE 3 is an electrical schematic of the impedances presented to eddy current flow along two possible paths;

FIGURE 4 is a drift curve for the electromagnetic flow transducer having flush mounted contacts such as shown in FIGURE 2;

FIGURE 5 is a diagram of the eddy current pattern in the invented electromagnetic flowmeter having improved recess contacts; and FIGURE 6 is a graph that compares the drift of the recess contacts of FIGURE 5 with the drift of the flush contacts of FIGURE 2.

A well-known form of an electromagnetic flowmeter for carrying out the invention is illustrated in FIGURE 1. This figure shows a conduit 10 of nonmagnetic material having a pair of probes 6 and 8 that include contacts or terminals 20 and 30 extending through its sides and connected in an electrical circuit 12 including a millivoltmeter or galvanometer 14. If the conduit 10 is formed of a nonconducting material, such as glass, the contacts 20 and 30 may be sealed and suitable openings formed in its sides, but if the conduit is formed of conducting material, such as brass, the contacts 20 and 30 must be insulated from the conduit wall.

For use in measuring flow through the conduit 10, an electromagnet 18 is arranged with its opposite poles diametrically across the conduit with the poles along a line approximately at right angles to the contacts 20 and 30. As fluid flows through the conduit, a voltage is induced therein proportional to the field strength and the rate of flow. This voltage is impressed on the millivoltmeter 14 through the contacts 20 and 30 and the circuit 12. The millivoltmeter 14 may be calibrated to read directly in terms of the rate of flow. The above-described electromagnetic flowmeter is well known in the art and is described in detail in such patents as U.S. Patent 2,149,847, issued to A. Kolin, March 7, 1939, and U.S. Patent 2,733,604 issued to W. H. Coulter on February 7, 1956.

Referring to FIGURE 2, the cutaway view of the conduit or contact holder shows the direction of the magnetic field, the direction of fluid flow and the contacts utilized to pick up the flow signal voltage. The use of an alternating magnetic field will result in eddy currents being induced in the fluid as shown by the broken lines. Some of the eddy currents pass in front of the signal contact and, since the contact is a better conductor than fluid, some of the eddy currents prefer to pass through the contacts and back into the solution. If the contact surface has one impedance on the surface where the eddy current enters the contact and another impedance at the surface where the current leaves the contact, a voltage will exist in the contact that is substantially different from the voltage that exists at a point adjacent the surface of the contact. If the surface impedances change, then the voltage measured will also change. It is believed that the variation of impedances over the surface of the contacts coupled with a continually changing contact surface results in a substantial zero drift error which is continually changing.

In pursuit of this belief, the approximate maximum drift error signal attributable to a difference in the contact surface impedance presented to the eddy currents was calculated. An examination and understanding of this calculation will add to the appreciation of the invention.

The equivalent electrical schematic of the eddy current flow through the fluid and one contact is shown in FIGURE 3. The contact 20 has a width $a$ and a thickness $c$. A third dimension does not affect the maximum error signal calibration. The fluid through which the eddy currents pass has a cylinder length $b$ and a diameter $L$. The voltage $V_1$ is a voltage at the center of the contact where the signal lead is attached. The voltage $V_2$ is the voltage in the fluid just outside the center of the contact and directly proportional to the fluid flow. To simplify the calculations, it is assumed that the circuit comprises lumped parameters. The impedance $Z_1$ represents the surface impedance of one-half the contact surface. The impedance $Z_3$ represents the impedance of the other half of the contact surface. The impedance $Z_2$ is the impedance across the inside of the contact and the impedance $Z_4$ represents the impedance in the fluid across the front of the contact. The impedance $Z_5$ represents the impedance of the return path through the fluid which, for the moment, neglects the other contact. The maximum difference between the voltages $V_1$ and $V_2$, hereinafter referred to as $\Delta V$, will indicate the largest possible error signal that can arise from the differences in the value and characteristics of the impedances $Z_1$–$Z_5$. The purpose of the following derivation is to calculate the maximum $\Delta V$.

Proceeding with the calculation of $\Delta V$, the loop equations are first written.

$$Z_1 i_1 + Z_2 i_1 + Z_3 i_1 + Z_4 (i_1 - i_2) = 0 \qquad (1)$$

$$Z_4 (i_2 - i_1) + Z_5 i_2 = -A \frac{dB}{dt} \qquad (2)$$

where $i_1$ and $i_2$ are the two loop currents as indicated, $B$=magnetic flux intensity and $A$=area of the bottom loop. The area of the top loop enclosing the surface of the contact with the liquid is assumed equal to zero.

Solving Equations 1 and 2 for $i_1$:

$$i_1 = \frac{-Z_4 A \frac{dB}{dt}}{(Z_4+Z_5)(Z_1+Z_2+Z_3+Z_4)-Z_4^2} \quad (3)$$

$$i_1 = \frac{-Z_4 A \frac{dB}{dt}}{(Z_4+Z_5)(Z_1+Z_2+Z_3)+Z_5 Z_4} \quad (4)$$

The voltage difference sought:

$$\Delta V = V_1 - V_2 \quad (5)$$

$$V_1 = \frac{V_3+V_6}{2} \quad (6)$$

$$V_2 = \frac{V_4+V_5}{2} \quad (7)$$

Substituting (6) and (7) into (5):

$$\Delta V = \frac{V_6-V_5}{2}+\frac{V_3-V_4}{2} \quad (8)$$

Referring to FIGURE 3 and Equation 8:

$$\Delta V = \frac{-Z_1 i_1}{2}+\frac{Z_3 i_1}{2}=\frac{Z_3-Z_1}{2}i_1 \quad (9)$$

Substituting the expression for $i_1$ of Equation 4 into 9:

$$\Delta V = \frac{Z_1-Z_3}{2} \cdot \frac{Z_4 A \frac{dB}{dt}}{(Z_4+Z_5)(Z_1+Z_2+Z_3)+Z_4 Z_5} \quad (10)$$

In order to simplify expression (10), a number of approximations can be made. The fact that the impedance $Z_2$ is through the conductive contact provides the relationship:

$$Z_2 \ll Z_1, Z_3 \quad (11)$$

The ratio of the impedance $Z_5$ to impedance $Z_4$ is proportional to the approximate lengths of the current paths and may be expressed as:

$$\frac{Z_5}{Z_4} \sim \frac{2b+\frac{a}{2}}{\frac{a}{2}} \approx \frac{4b}{a} \quad (12)$$

This shows that $Z_5$ is large relative to $Z_4$. For small contacts:

$$Z_4 < Z_1, Z_3 \quad (13)$$

Since $Z_5$ is large relative to $Z_4$, the expressions in the denominator of Equation 10 involving $Z_4$ and not $Z_5$ can be neglected. As noted in expressions (11) and (13), $Z_2$ and $Z_4$ are small relative to $Z_1$ and $Z_3$. Therefore, $Z_5 \times Z_4$ and $Z_2 \times Z_5$ can be neglected. With these expressions neglected, Equation 10 can be written as follows:

$$\Delta V = \frac{Z_1-Z_3}{2} \times \frac{Z_4 A \frac{dB}{dt}}{Z_5(Z_1+Z_3)} = \frac{Z_1-Z_3}{Z_1+Z_3} \times \frac{A \frac{dB}{dt} a}{8b} \quad (14)$$

Noting that $$A = bL \quad (15)$$

and for a sine wave magnetic field $$\frac{dB}{dt} = jwB \quad (16)$$

where $w$ = the angular frequency of B. The series equivalent for the surface impedances are $$Z_1 = R_1 + \frac{1}{jwc_1} \quad (17)$$

and $$Z_3 = R_3 + \frac{1}{jwc_3} \quad (18)$$

Substituting the expressions (15), (16), (17) and (18) in Equation 14 gives:

$$\Delta V = \frac{R_1-R_3-j\left(\frac{1}{wc_1}-\frac{1}{wc_3}\right)}{R_1+R_3-j\left(\frac{1}{wc_1}+\frac{1}{wj_3}\right)} + \frac{LjwBa}{8} \quad (19)$$

and rationalizing:

$$\Delta V = \frac{awBL}{8} \times \frac{\frac{2R_3}{wc_1}-\frac{2R_1}{wc_3}+j\left(R_1^2-R_3^2+\frac{1}{wc_1^2}-\frac{1}{wb_3^2}\right)}{(R_1+R_3)^2+\left(\frac{1}{wc_1}+\frac{1}{w_3}\right)^2} \quad (20)$$

Synchronous detection can eliminate the quadrature signal which represents the imaginary term. The part remaining is:

$$\Delta V \text{ real} = \frac{awBL}{8} \times \frac{\frac{2R_3}{wc_1}-\frac{2R_1}{wc_3}}{(R_1+R_3)^2+\left(\frac{1}{wc_1}+\frac{1}{wc_3}\right)^2} \quad (21)$$

The greatest difference in impedance $Z_1$ and impedance $Z_3$ and consequently the $\Delta V$ maximum would exist when either $Z_1$ or $Z_3$ was essentially resistive and the other essentially capacitive. Hence, if we let $$R_1 \to 0 \text{ and } \frac{1}{wc_3} \to 0 \quad (22)$$

a maximum value of $\Delta V$ is obtained. Experimentally, $wRc$ for contacts is roughly equal to 1 when measured near 60 cycles and is independent of area. So we assume that $$wR_3 c_3 \approx 1 \quad (23)$$

Substituting (22) and (23) into (21) gives:

$$\Delta V_{max} \cong \frac{awBL}{8} \quad (24)$$

The error voltage $\Delta V$ can be related to an equivalent flow velocity by equating the error signal to flow signal $$\frac{awBL}{8} \approx BvL \quad (25)$$

where $v$ is the average fluid velocity. Therefore:

$$\text{the maximum equivalent error flow velocity} = \frac{aw}{8} \quad (26)$$

A similar calculation including the effect of contact thickness $c$ leads to a $$\text{maximum velocity equivalent} = \frac{aw}{8}\left(1+\frac{c}{L}\right) \quad (27)$$

Substituting typical values into (25) we can see the maximum possible offset produced by the eddy current effect. For example, at 60 c.p.s. for a contact one millimeter wide by two millimeters thick, the maximum drift error signal is roughly 5 cm./sec. or about 600 cc./min. for a 16 millimeter I.D. head. For two signal contacts the errors may add.

It should be understood that these calculations indicate an approximate range of drift error that could exist as a result of different or changing contact impedances. To determine whether the zero drift or zero error signal is attributable to the impedance variations along the contact, it was necessary to first measure the error signal with the usual flush contact in the flowmeter and then to measure the error signal with the newly conceived and invented contact that would tend to equalize the impedances along the contact surface.

To determine the zero drift with the flush type of contact, a contact holder (see FIGURES 1 and 2) having an inside diameter of 16 millimeters and having coined silver flush contacts mounted thereon was immersed in a beaker of motionless saline solution. The usual electronic sensing circuitry 12, 14 was connected to the contact holder.

A zero reading on the recorder 14 was obtained by shorting the input circuit of the flowmeter electronic circuitry. A 60 c.p.s. sine wave was then applied to the electromagnet 18 and the flowmeter output was recorded for 16 hours. The resulting drift error is graphically shown in FIGURE 4. From this graph it can be seen that the indicated flow drifted slowly to a value of about 250 cc./min. during the 16 hours test period. A casual checking of the flow for a minute or five minutes would have indicated an apparently constant offset. If the meter had been zeroed on such a basis, an hour later an appreciable error would have been made. The drift curves, such as shown in FIGURE 4, were different each time they were recorded. Various tests were conducted to verify that this result was not related to the electronics involved or the quadrature signal.

As a result of these tests and calculations, a new contact was conceived which substantially reduces the effect of unequal impedances along the surface of the contact. This newly conceived contact is shown in FIGURE 5 and comprises recesses or slots 22 of a width $a$. The silver contacts 24 having a thickness $c$ are placed at the bottom of the recesses 22. A wetting agent 26, such as cotton or tissue soaked in a saline solution or a chemical wetting agent such as Kodak's "Photoflow," is placed in the recesses 22. This recessed contact and wetting agent combination may be considered as a means for eliminating or substantially reducing the zero drift error attributable to eddy currents or more particularly they may be regarded as a means for attenuating the eddy current flow through the contacts and for making effective contact with the conduit that carries the fluid.

An approximate calculation will give some idea of the improved performance that may be obtained by the utilization of the recessed contact. Such a calculation shows that the ratio (R) of eddy currents before indenting to the eddy currents after indenting can be expressed as:

$$R \approx \frac{L+c}{\frac{8}{\pi^2}Le^{\frac{-\pi d}{a}} + \frac{a(2d-a)}{4d} + c}$$

The calculation also results in the optimum values of $a$ and $d$ being expressed as $d \approx 2a$. In accordance with these expressions, recessing a one millimeter contact to a depth 2 millimeters in a 16 millimeter flow tube would reduce the eddy current effect by approximately 35 times.

The invention in its theory was finally verified in an experimental test utilizing the recessed silver contacts with the recesses being filled with a wetted cleansing tissue. The resulting zero drift was measured for 16 hours utilizing an experimental setup as described with reference to FIGURE 4. The measurements were recorded as shown in the graph of FIGURE 6. The zero drift measured was substantially constant and was reduced to 10 cc./min. The outstanding performance of the improved construction is most dramatically depicted in the graphical comparison of the prior art flush contact zero drift and the zero drift of the improved recessed contact as shown in FIGURE 6.

It will be appreciated that once the cause of the zero drift is realized, many approaches to eliminating this error can be conceived. These approaches may take the form of different, more stable contact materials, electronic compensating circuitry, various measuring techniques and different contact and recess configurations. It is to be understood that these approaches are consistent with the broad aspects of the invention.

It will be understood that the invention is not to be limited to the exact construction shown and described, but that various changes and modifications may be made without departing from the spirit and scope of the invention as defined in the appended claims.

We claim:
1. In a flowmeter, the combination comprising a conduit for carrying a moving conductive liquid, a magnetic means for applying a magnetic field across said conduit, a pair of contacts placed in recesses formed in the internal wall of said conduit and oriented at an angle to the magnetic field produced by said magnetic means and a wetting agent placed in said recesses between said contacts and said liquid.

2. In a flowmeter for detecting the potential difference in moving conductive liquid, the combination comprising a conduit carrying moving conductive liquid, a magnetic means for applying a magnetic field across said conduit, a pair of recesses on the inside diameter of said conduit, a conductive contact located in each of said recesses remote from the path of movement of said liquid and a wetting agent located in said recess between said contact and said liquid.

3. In a flowmeter, the combination comprising a conduit carrying a moving conductive liquid, a magnetic means for applying a magnetic field across said conduit, and a plurality of probes cooperating to detect the potential difference caused by the conductive liquid moving through the magnetic field; each of said probes comprising a conductive contact located in a recess in the internal wall of said conduit; and a wetting agent located in said recess between said contact and said liquid.

4. In a magnetic flowmeter for detecting the potential difference caused by conductive liquid moving in a conduit having an inner wall surface, the combination comprising magnetic means for applying a magnetic field across said conduit, a pair of recesses in said conduit, a conductive contact placed in each of said pair of recesses remote from said surface and a wetting agent in said recesses between said contacts and said liquid.

5. In a magnetic flowmeter for detecting the potential difference caused by a conductive liquid moving in a conduit, the combination comprising magnetic means for applying a magnetic field across said conduit, a pair of recesses in the conduit and a conductive contact placed in each of said recesses remote from the path of movement of said liquid.

6. In a magnetic flowmeter having a plurality of probes cooperating to detect the potential difference caused by a conductive liquid moving in a conduit, each probe comprising a conductive contact placed in a recess in the internal wall of said conduit at a depth approximately twice the width of said recess and means for applying a magnetic field across said conduit.

7. In a magnetic flowmeter for detecting the potential difference caused by a conductive liquid moving in a conduit, the combination comprising means for applying a magnetic field across said conduit, a pair of recesses in the conduit, said recesses having a width of a given dimension, a conductive contact placed in each of said recesses at a depth of approximately twice said given dimension and a wetting agent placed in said recesses between said contact and said liquid.

References Cited by the Examiner
UNITED STATES PATENTS
2,949,551  8/1960  Sturgeon _____ 73—194
3,247,091  4/1966  Stuetzer _____ 204—302

OTHER REFERENCES
IRE Transactions on Medical Electronics, December 1955. The following articles and pages are in this publication: Westersten et al., pages 213–216, Abel, pages 216–219; Spencer, et al., pages 220–228; Cordell et al., pages 228–231 and Feder et al., pages 240–245.

Einhorn, Transactions of the Royal Society of South Africa, volume 28, pages 143–160; 1940–41, pages 152–153 and 156–159 relied on.

RICHARD C. QUEISSER, *Primary Examiner.*

LAWRENCE R. FRANKLIN, *Assistant Examiner.*